(12) United States Patent
Pfeil et al.

(10) Patent No.: US 11,214,518 B2
(45) Date of Patent: Jan. 4, 2022

(54) FASTENING SYSTEM AND USE THEREOF

(71) Applicant: HILTI AKTIENGESELLSCHAFT, Schaan (LI)

(72) Inventors: Armin Pfeil, Kaufering (DE); Jens Bunzen, Augsburg (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 72 days.

(21) Appl. No.: 15/765,504

(22) PCT Filed: Oct. 19, 2016

(86) PCT No.: PCT/EP2016/075031
§ 371 (c)(1),
(2) Date: Apr. 3, 2018

(87) PCT Pub. No.: WO2017/067956
PCT Pub. Date: Apr. 27, 2017

(65) Prior Publication Data
US 2019/0071353 A1 Mar. 7, 2019

(30) Foreign Application Priority Data
Oct. 20, 2015 (EP) .................................. 15190509

(51) Int. Cl.
| | | |
|---|---|---|
| *C04B 28/06* | (2006.01) | |
| *C04B 24/04* | (2006.01) | |
| *C04B 22/06* | (2006.01) | |
| *C04B 14/28* | (2006.01) | |
| *C04B 14/22* | (2006.01) | |
| *C04B 14/30* | (2006.01) | |
| *C04B 40/06* | (2006.01) | |
| *F16B 13/14* | (2006.01) | |
| *E21D 20/02* | (2006.01) | |
| *C04B 111/00* | (2006.01) | |
| *C04B 103/20* | (2006.01) | |

(52) U.S. Cl.
CPC .............. *C04B 28/06* (2013.01); *C04B 14/22* (2013.01); *C04B 14/28* (2013.01); *C04B 14/303* (2013.01); *C04B 22/062* (2013.01); *C04B 24/04* (2013.01); *C04B 28/065* (2013.01); *C04B 40/065* (2013.01); *C04B 40/0625* (2013.01); *C04B 40/0658* (2013.01); *E21D 20/021* (2013.01); *F16B 13/142* (2013.01); *C04B 2103/20* (2013.01); *C04B 2111/00715* (2013.01); *Y02W 30/91* (2015.05)

(58) Field of Classification Search
CPC ......... B60K 35/00; B60K 37/06; G06F 3/013; G06F 3/017; G06F 3/0304; G06F 3/04812; G06F 3/0482; G06F 3/04842; C04B 28/145; C04B 40/0039; C04B 40/0625; C04B 40/0658; C04B 14/26; C04B 18/146; C04B 2103/0008; C04B 2103/0094; C04B 2103/10; C04B 2111/00715; C04B 22/142; C04B 24/38; C04B 24/383; C04B 7/32; C04B 2103/14; C04B 22/0093; C04B 40/0633; E04B 1/4157; E21D 20/021; F16B 13/142; Y02W 30/91
See application file for complete search history.

(56) References Cited

U.S. PATENT DOCUMENTS

| | | | |
|---|---|---|---|
| 4,126,009 A | | 11/1978 | Tomic |
| 4,190,454 A | * | 2/1980 | Yamagisi ............ C04B 22/0093 106/695 |
| 4,305,687 A | | 12/1981 | Parker |
| 4,455,171 A | | 6/1984 | Spensley et al. |
| 5,565,026 A | | 10/1996 | Hense et al. |
| 6,029,417 A | | 2/2000 | Leibhard et al. |
| 6,240,696 B1 | | 6/2001 | Ludwig et al. |
| 8,268,932 B2 | | 9/2012 | Jansen et al. |
| 8,801,851 B2 | | 8/2014 | Jezequel et al. |
| 8,808,449 B2 | | 8/2014 | Jezequel et al. |
| 9,464,524 B2 | | 10/2016 | Glogger et al. |
| 2007/0266906 A1 | | 11/2007 | Garcia |
| 2008/0300361 A1 | | 12/2008 | Jansen et al. |
| 2009/0151604 A1 | | 6/2009 | Hirao et al. |
| 2010/0175589 A1 | | 7/2010 | Charpentier et al. |
| 2011/0067600 A1 | | 3/2011 | Constantz et al. |
| 2012/0312193 A1 | | 12/2012 | Jezequel et al. |
| 2012/0315464 A1 | | 12/2012 | Refouvelet et al. |
| 2012/0318171 A1 | | 12/2012 | Jezequel et al. |

(Continued)

FOREIGN PATENT DOCUMENTS

| | | |
|---|---|---|
| CN | 1213046 | 4/1999 |
| CN | 101283018 | 10/2008 |

(Continued)

OTHER PUBLICATIONS

U.S. Appl. No. 15/764,897, filed Mar. 30, 2018, Armin Pfeil.

(Continued)

*Primary Examiner* — Shuangyi Abu Ali
(74) *Attorney, Agent, or Firm* — Grüneberg and Myers PLLC

(57) ABSTRACT

A fastening system for chemically fastening an anchor, the fastening system including a chemical anchor that is a ready-for-use two-component mortar system based on albuminous cement, and an anchor rod comprising an attachment region and an anchoring region. The anchor rod is insertable into a borehole and has a profiled section including a plurality of expansion sections disposed axially in a row which are conically shaped.

16 Claims, No Drawings

(56) References Cited

U.S. PATENT DOCUMENTS

| | | | |
|---|---|---|---|
| 2013/0112432 A1* | 5/2013 | Buergel | C04B 24/122 |
| | | | 166/382 |
| 2013/0295378 A1 | 11/2013 | Bonin et al. | |
| 2014/0216653 A1 | 8/2014 | Wu et al. | |
| 2014/0235760 A1 | 8/2014 | Bichler et al. | |
| 2014/0343194 A1* | 11/2014 | Taquet | C04B 22/165 |
| | | | 524/5 |
| 2014/0363239 A1* | 12/2014 | Glogger | E21D 20/02 |
| | | | 405/259.5 |
| 2015/0203407 A1 | 7/2015 | Girot et al. | |
| 2017/0349498 A1 | 12/2017 | Bernard et al. | |
| 2018/0282217 A1 | 10/2018 | Falger et al. | |

FOREIGN PATENT DOCUMENTS

| | | | | |
|---|---|---|---|---|
| CN | 103827515 | | 5/2014 | |
| DE | 10 2011 083 153 | | 3/2013 | |
| EP | 0 005 987 | | 12/1979 | |
| EP | 0 081 385 | | 6/1983 | |
| EP | 0 113 593 | | 7/1984 | |
| EP | 0 856 669 | | 8/1998 | |
| EP | 0 867 624 | | 9/1998 | |
| EP | 1 213 492 | | 6/2002 | |
| EP | 2 162 410 | | 5/2011 | |
| EP | 2679560 A2 * | | 1/2014 | C04B 28/08 |
| EP | 3 078 646 | | 10/2016 | |
| FR | 2 918 055 | | 1/2009 | |
| FR | 2 956 397 | | 8/2011 | |
| FR | 3 030 504 | | 6/2016 | |
| JP | 58-115052 | | 7/1983 | |
| JP | 2000-46029 | | 2/2000 | |
| JP | 6122566 | | 4/2017 | |
| RU | 2 341 624 | | 12/2008 | |
| WO | WO-2013041259 A1 * | 3/2013 | | E21D 20/021 |
| WO | 2013/093344 | | 6/2013 | |
| WO | WO-2013093344 A1 * | 6/2013 | | C04B 28/06 |
| WO | 2017/067951 | | 4/2017 | |
| WO | 2017/067952 | | 4/2017 | |
| WO | 2017/067953 | | 4/2017 | |
| WO | 2017/067954 | | 4/2017 | |

OTHER PUBLICATIONS

U.S. Appl. No. 15/764,295, filed Mar. 28, 2018, Armin Pfeil.
U.S. Appl. No. 15/765,509, filed Apr. 3, 2018, Armin Pfeil
U.S. Appl. No. 15/769,444, filed Apr. 19, 2018, Armin Pfeil.
Inland River Surveying, Canalization Project; 1980, p. 380 with English translation.
Ma Ying et al., User Manuel of Huibao Curtain Wall Calculation Software; 2015, p. 268, with English translation.
Xu Xianjiang et al, The Latest Major Points of Highway Engineering Construction and Prevention of Common Problems; 2001, vol. 1, p. 567 with English translation.
International Search Report dated in PCT/EP2016/075031 dated Jan. 20, 2017.
Written Opinion dated PCT/EP2016/075031 dated Jan. 20, 2017.
U.S. Appl. No. 15/764,897, filed Mar 30, 2018, U.S. Pat. No. 2018/0282217, Falger et al.
Office Action dated Dec. 8, 2020 in U.S. Appl. No. 16/498,231, 18 pages.
International Search Report dated Apr. 24, 2018 in PCT/EP2018/058065.
Written Opinion dated Apr. 24, 2018 in PCT/EP2018/058065.
Office Action dated Dec. 31, 2020 in U.S. Appl. No. 16/498,231, 17 pages.

* cited by examiner

FASTENING SYSTEM AND USE THEREOF

FIELD OF THE INVENTION

The present invention pertains to a fastening system for chemically fastening of anchoring means in mineral surfaces, such as structures made of brickwork, concrete, pervious concrete or natural stone. In particular, the fastening system comprises a chemical anchor being a ready-for-use two-component mortar system based on aluminous cement, and anchoring means, preferably an anchor rod comprising an attachment region and an anchoring region which is insertable into a borehole and which has a profiled section including a plurality of expansion sections disposed axially in a row which are conically shaped, to be chemically fastened in a mineral surface.

BACKGROUND OF THE INVENTION

In addition to conventional fastening techniques, wherein fastening points are prepared with the aid of expansion bolts or undercut systems anchored in a borehole in a force-fit and/or form-fit, chemical fastening techniques have been known from the prior art, wherein an anchor rod or another fastening element is inserted into a borehole filled with a mortar compound and is fixed after the mortar compound has cured. The advantage of these types of composite anchoring systems is that, independent of the selected fastening element; they are largely free of expansion pressure and therefore permit low axial and edge spacing.

Anchoring means, in particular anchor rods, are known from the prior art that have a plurality of expansion segments as an anchoring region, which segments are formed from the shaft of the anchor rod, so-called composite expansion anchors. In the case of these anchor rods, the transmission of force takes place in the cured state of the mortar compound, on the one hand, through the bonding effect of the composite mortar between the borehole wall and the mortar compound and, on the other hand, via an expansion effect through the expansion segments. Due to the expansion effect, when the anchor rod is under stress, the normal forces (tensile forces) acting thereon are converted into radially acting expansion forces so that this fastening arrangement can subsequently expand and can therefore also be applied in the tensile zone of a component or in cracked concrete.

A disadvantage of the known composite expansion anchors is that they are only conditionally suitable for fastenings that are close to the edge, because of the expansion forces that are quite high to some extent.

Moreover, for a secure anchoring of the anchoring means, composite anchors require a time-consuming cleaning of the borehole prior to introducing the curable mortar compound, which, furthermore, leads to considerable contamination of the work environment with dust. If cleaning does not take place or it is only inadequate, this also has a negative impact on the load ratings. In the most unfavorable case, particularly when there is a lot of bore dust between the borehole wall and the cured mortar compound, the anchor rod can be pulled out of the borehole with the mortar shell when stress is applied.

Further, when it comes to chemically fastening of anchoring means, known mortar compositions that may be used to fill the borehole in order to fastening anchoring means are either based on organic or inorganic systems, of which many system are two-component mortar systems, which are sometimes also referred to as kit-of-parts, in which each of the components is intended to be mixed prior to use or during application in order to initiate the curing process to provide good chemical fastening of anchoring means in mineral surfaces. For example, organic systems based on free-radically polymerizable resins are used when fast curing is desired. However, such systems are generally known to be polluting, expensive, potentially hazardous and/or toxic for the environment and for the person who handles them and they often need to be specifically labelled. Moreover, organic systems often show a much reduced stability when thermally exposed to strong sunlight or otherwise elevated temperatures.

In order to overcome these drawbacks, predominantly mineral systems based on aluminous cement have been developed. Aluminous cement has as its major constituent monocalcium aluminate and is widely used in the building and construction industries as the final products evidence a high level of mechanical performance over extended periods of time. Also, aluminous cement is resistant to bases and attains its maximum strength more rapidly than Portland cement and is capable of withstanding solutions of sulfates. Hence, aluminous cement systems are preferably employed in the field of chemical anchoring.

Known inorganic systems, for example from in EP 2 162 410, are ready-for-use dual-component systems. The system of EP 2 162 410 includes a part A based aqueous-phase aluminous cement, retarded by boric acid or a salt thereof, and a part B for initiating the curing process. The initiator in part B is made of only lithium salts and cures the aluminous cement in less than 5 min. EP 0 081 385 also discloses a dual-component system including a set-inhibited aqueous high alumina cement composition and a reactivator composition. The set inhibitor is boric acid and the reactivator composition includes lithium salts.

However, these aluminous cement aqueous suspensions retarded by boric acid or salts thereof, are often not very stable for a sufficient time to be stored prior to use. Moreover, boric acid is quite toxic as well as ecotoxic. EP 2 794 510 describes a stabilized aqueous suspension comprising aluminous cement and/or calcium sulfoaluminous cement, which is inhibited by a phosphorous-containing compound and can be stored for a sufficient time also at high temperatures.

Nevertheless, when it comes to chemically fastening of anchoring means in mineral surfaces, a rapid curing time, i.e. of less than 5 minutes, is not always required. Further, most of the known systems lack sufficient fluidity for most practical applications of the resultant compositions. Often such prior art compositions also evidence a tendency to crack in a relatively short time.

Moreover, it is known that fastening systems employing conventional anchor rods, such as threaded anchor rods, do not exhibit high load ratings as well as low expansion pressure in uncleaned and cracked boreholes and with fastenings that are close to the edge as already mentioned above.

Therefore, there is a need for a fastening system based on aluminous cement and an anchoring means that is superior over the prior art systems with regard to environmental aspects, health and safety, handling, storage time and a good balance between settling and hardening of the mortar, thereby exhibiting high load ratings as well as low expansion pressure in uncleaned and cracked boreholes and with fastenings that are close to the edge.

In view of the above, it is an object of the present invention to provide a fastening system for chemically fastening of anchoring means in mineral surfaces, such as structures made of brickwork, concrete, pervious concrete or natural stone, which overcomes the disadvantages of the prior art systems. In particular, it is an object to provide a fastening system comprising a chemical anchor that is ready-for-use, which can be handled easily, which is stably stored for a certain period of time prior to use, which exhibits a good balance between setting and hardening and still has an excellent mechanical performance, even under the influence of elevated temperatures; and an anchoring means, preferably an anchor rod, exhibiting high load ratings as well as low expansion pressure in uncleaned and cracked boreholes and with fastenings that are close to the edge.

In particular, it is an object of the present invention to provide a fastening system comprising a chemical anchor being a ready-for-use two-component mortar system based on aluminous cement, and an anchor rod, comprising an attachment region and an anchoring region which is insertable into a borehole and having a profiled section including a plurality of expansion sections disposed axially in a row which are conically shaped, to be chemically fastened in a mineral surface, which eliminates the drawbacks of the prior art systems.

Furthermore, it is an object of the present invention to provide a fastening system that is used for chemical fastening of anchoring means in mineral surfaces.

These and other objectives as they will become apparent from the ensuring description of the invention are solved by the present invention as described in the independent claims. The dependent claims pertain to preferred embodiments.

SUMMARY OF THE INVENTION

In one aspect, the present invention provides a fastening system for chemically fastening of anchoring means in mineral surfaces, such as structures made of brickwork, concrete, pervious concrete or natural stone. In particular, the fastening system comprises a chemical anchor being a ready-for-use two-component mortar system based on aluminous cement, and anchoring means, preferably an anchor rod, comprising an attachment region and an anchoring region which is insertable into a borehole and having a profiled section including a plurality of expansion sections disposed axially in a row which are conically shaped, to be chemically fastened in a mineral surface.

Especially, the two-component mortar system comprises a curable aqueous-phase aluminous cement component A and an initiator component B in aqueous-phase for initiating the curing process, component A comprising at least one blocking agent selected from the group consisting of phosphoric acid, metaphosphoric acid, phosphorous acid and phosphonic acids, at least one plasticizer and water, and component B comprising an initiator, at least one retarder, at least one mineral filler and water.

In another aspect, the present invention provides a fastening system that is used for chemical fastening of anchoring means in mineral surfaces.

DETAILED DESCRIPTION OF THE INVENTION

The following terms and definitions will be used in the context of the present invention:

As used in the context of present invention, the singular forms of "a" and "an" also include the respective plurals unless the context clearly dictates otherwise. Thus, the term "a" or "an" is intended to mean "one or more" or "at least one", unless indicated otherwise.

The term "aluminous cement" in the context of the present invention refers to a calcium aluminate cement that consists predominantly of hydraulic active calcium aluminates. Alternative names are "high-alumina cement" or "Ciment fondu" in French. The main active constituent of calcium aluminate cements is monocalcium aluminate ($CaAl_2O_4$, $CaO.Al_2O_3$, or CA in the cement chemist notation).

The term "shelf life" in the context of the present invention refers to the time during which a component stays in the form of a more or less fluid aqueous suspension of solid products, capable of coming back to the aqueous-suspension by mechanical means, without setting or losing its reactivity.

The term "initiator" in the context of the present invention refers to a compound or composition that modifies the chemical environment to start a particular chemical reaction. In the present invention the initiator modifies the pH-value of the mortar suspension thereby de-blocking the hydraulic binder in the final mixture.

The term "retarder" in the context of the present invention refers to a compound or composition that modifies the chemical environment to delay a particular chemical reaction. In the present invention the retarder modifies the hydration ability of the calcium aluminate cement of the mortar suspension thereby delaying the hydraulic binder action in the final mixture.

The term "initial set-time" in the context of the present invention refers to the time at which the mixture of component A and component B starts to set after mixing. During the time period after mixing, the mixture stays in the form of a more or less fluid aqueous suspension or paste of solid products.

The present invention pertains to a fastening system for chemically fastening of anchoring means comprising a chemical anchor being a ready-for-use two-component mortar system based on aluminous cement, and an anchor rod comprising an attachment region and an anchoring region which is insertable into a borehole and which has a profiled section including a plurality of expansion sections disposed axially in a row which are conically shaped.

In particular, the two-component mortar system based on aluminous cement of the fastening system according to the present invention comprises a curable aqueous-phase aluminous cement component A and an initiator component B in aqueous-phase for initiating the curing process, component A further comprises at least one blocking agent selected from the group consisting of phosphoric acid, metaphosphoric acid, phosphorous acid and phosphonic acids, at least one plasticizer and water, and component B comprises an initiator, at least one retarder, at least one mineral filler and water, wherein the initiator comprises a mixture of alkali and/or alkaline earth metal salts, the at least one retarder is selected from the group consisting of citric acid, tartaric acid, lactic acid, salicylic acid, gluconic acid and mixtures thereof, and the mineral filler is selected from the group consisting of limestone fillers, sand, corundum, dolomite, alkaline-resistant glass, crushed stones, gravels, pebbles and mixtures thereof.

Component A of the two-component mortar system of the fastening system according to the present invention is based on an aqueous-phase aluminous cement (CA) or an aqueous-phase calcium sulfoaluminate cement (CAS). The calcium aluminate cement which can be used in the present invention is characterized by rapid set and rapid hardening, rapid drying and shrinkage compensation when mixed with calcium sulfates, excellent resistance to corrosion and shrinkage. Such a calcium aluminate cement suitable to be used in the present invention is for example Ternal® White (Kerneos, France).

If component A comprises a mixture of aluminous cement (CAC) and calcium sulfate (CaSO$_4$), rapid ettringite formation takes place during hydration. In concrete chemistry hexacalcium aluminate trisulfate hydrate, represented by the general formula $(CaO)_6(Al_2O_3)(SO_3)_3.32H_2O$ or $(CaO)_3(Al_2O_3)(CaSO_4)_3.32H_2O$, is formed by the reaction of calcium aluminate with calcium sulfate, resulting in quick setting and hardening as well as in shrinkage compensation or even expansion. With moderate increase of the sulfate content shrinkage compensation can be achieved.

Component A of the two-component mortar system of the fastening system according to the present invention comprises at least about 40 wt.-%, preferably at least about 50 wt.-%, more preferably at least about 60 wt.-%, most preferably at least about 70 wt.-%, from about 40 wt.-% to about 95 wt.-%, preferably from about 50 wt.-% to about 85 wt.-%, more preferably from about 60 wt.-% to about 80 wt.-%, most preferably from about 70 wt.-% to about 75 wt.-% of aluminous cement, based on the total weight of component A.

According to an alternative embodiment of the invention, component A of the two-component mortar system of the fastening system comprises at least about 20 wt.-%, preferably at least about 30 wt.-%, more preferably at least about 40 wt.-%, most preferably at least about 50 wt.-%, from about 20 wt.-% to about 80 wt.-%, preferably from about 30 wt.-% to about 70 wt.-%, more preferably from about 35 wt.-% to about 60 wt.-%, most preferably from about 40 wt.-% to about 55 wt.-% of aluminous cement, based on the total weight of component A and at least about 5 wt.-%, preferably at least about 10 wt.-%, more preferably at least about 15 wt.-%, most preferably at least about 20 wt.-%, from about 1 wt.-% to about 50 wt.-%, preferably from about 5 wt.-% to about 40 wt.-%, more preferably from about 10 wt.-% to about 30 wt.-%, most preferably from about 15 wt.-% to about 25 wt.-% of calcium sulfate, preferably calcium sulfate hemihydrate, based on the total weight of component A. In a preferred alternative embodiment of the two-component mortar system of the fastening system of the present invention, the ratio of CaSO$_4$/CAC of component A should be less or equal to 35:65.

The blocking agent comprised in component A of the two-component mortar system of the fastening system according to the present invention is selected from the group consisting of phosphoric acid, metaphosphoric acid, phosphorous acid and phosphonic acids, preferably is phosphoric acid or metaphosphoric acid, most preferably is phosphoric acid, in particular an 85% aqueous solution of phosphoric acid. Component A comprises at least about 0.1 wt.-%, preferably at least about 0.3 wt.-%, more preferably at least about 0.4 wt.-%, most preferably at least about 0.5 wt.-%, from about 0.1 wt.-% to about 20 wt.-%, preferably from about 0.1 wt.-% to about 15 wt.-%, more preferably from about 0.1 wt.-% to about 10 wt.-%, most preferably from about 0.3 wt.-% to about 10 wt.-% of said blocking agent, based on the total weight of component A. In a preferred embodiment, component A of the two-component mortar system of the fastening system comprises from about 0.3 wt.-% to about 10 wt.-% of 85% aqueous solution of phosphoric acid, based on the total weight of component A. Preferably, the amounts of aluminous cement and/or calcium sulfoaluminate cement by weight relative to the hydraulic binder total weight are higher than any of the following values: 50%, 60%, 70%, 80%, 90%, 95%, 99% or are 100%.

The plasticizer comprised in component A of the two-component mortar system of the fastening system according to the present invention is selected from the group consisting of low molecular weight (LMW) polyacrylic acid polymers, superplasticizers from the family of polyphosphonate polyox and polycarbonate polyox, and ethacryl superplasticizers from the polycarboxylate ether group, and mixtures thereof, for example Ethacryl™ G (Coatex, Arkema Group, France), Acumer™ 1051 (Rohm and Haas, U.K.), or Sika® ViscoCrete®-20 HE (Sika, Germany). Suitable plasticizers are commercially available products. Component A of the two-component mortar system of the fastening system comprises at least about 0.2 wt.-%, preferably at least about 0.3 wt.-%, more preferably at least about 0.4 wt.-%, most preferably at least about 0.5 wt.-%, from about 0.2 wt.-% to about 20 wt.-%, preferably from about 0.3 wt.-% to about 15 wt.-%, more preferably from about 0.4 wt.-% to about 10 wt.-%, most preferably from about 0.5 wt.-% to about 5 wt.-% of said plasticizer, based on the total weight of component A.

In an advantageous embodiment, component A of the two-component mortar system of the fastening system further comprises the following characteristics, taken alone or in combination.

Component A may additionally comprise a thickening agent. The thickening agents which can be used in the present invention may be selected from the group consisting of organic products, such as xanthan gum, welan gum or DIUTAN® gum (CPKelko, USA), starched-derived ethers, guar-derived ethers, polyacrylamide, carrageenan, agar agar, and mineral products, such as clay, and their mixtures. Suitable thickening agents are commercially available products. Component A comprises at least about 0.01 wt.-%, preferably at least about 0.1 wt.-%, more preferably at least about 0.2 wt.-%, most preferably at least about 0.3 wt.-%, from about 0.01 wt.-% to about 10 wt.-%, preferably from about 0.1 wt.-% to about 5 wt.-%, more preferably from about 0.2 wt.-% to about 1 wt.-%, most preferably from about 0.3 wt.-% to about 0.7 wt.-% of said thickening agent, based on the total weight of component A.

Component A may further comprise an antibacterial or biocidal agent. The antibacterial or biocidal agents which can be used in the present invention may be selected from the group consisting of compounds of the isothiazolinone family, such as methylisothiazolinone (MIT), octylisothiazolinone (OIT) and benzoisothiazolinone (BIT) and their mixtures. Suitable antibacterial or biocidal agents are commercially available products. Exemplarily mentioned are Ecocide K35R (Progiven, France) and Nuosept OB 03 (Ashland, The Netherlands). Component A comprises at least about 0.001 wt.-%, preferably at least about 0.005 wt.-%, more preferably at least about 0.01 wt.-%, most preferably at least about 0.015 wt.-%, from about 0.001 wt.-% to about 1.5 wt.-%, preferably from about 0.005 wt.-% to about 0.1 wt.-%, more preferably from about 0.01 wt.-% to about 0.075 wt.-%, most preferably from about 0.015 wt.-% to about 0.03 wt.-% of said antibacterial or biocidal agent, based on the total weight of component A. In a preferred embodiment, component A of the two-component mortar system of the fastening system comprises from about 0.015 wt.-% to about 0.03 wt.-% of Nuosept OB 03, based on the total weight of component A.

In an alternative embodiment, component A of the two-component mortar system of the fastening system comprises at least one filler, in particular an organic or mineral filler. The filler which can be used in the present invention may be selected from the group consisting of quartz powder, preferably quartz powder having an averaged grain size (d50%) of about 16 μm, quartz sand, clay, fly ash, fumed silica, carbonate compounds, pigments, titanium oxides, light fillers, and their mixtures. Suitable mineral fillers are commercially available products. Exemplarily mentioned is quartz powder Millisil W12 or W6 (Quarzwerke GmbH, Germany). Component A of the two-component mortar system of the fastening system comprises at least about 1 wt.-%, preferably at least about 2 wt.-%, more preferably at least about 5 wt.-%, most preferably at least about 8 wt.-%, from about 1 wt.-% to about 50 wt.-%, preferably from about 2 wt.-% to about 40 wt.-%, more preferably from about 5 wt.-% to about 30 wt.-%, most preferably from about 8 wt.-% to about 20 wt.-% of said at least one filler, based on the total weight of component A.

The water content comprised in component A of the two-component mortar system of the fastening system is at least about 1 wt.-%, preferably at least about 5 wt.-%, more preferably at least about 10 wt.-%, most preferably at least about 20 wt.-%, from about 1 wt.-% to about 50 wt.-%, preferably from about 5 wt.-% to about 40 wt.-%, more preferably from about 10 wt.-% to about 30 wt.-%, most preferably from about 15 wt.-% to about 25 wt.-%, based on the total weight of component A.

The presence of a plasticizer, thickening agent as well as an antibacterial or biocidal agent does not change the overall inorganic nature of the cementitious component A of the two-component mortar system of the fastening system.

Component A of the two-component mortar system of the fastening system comprising the aluminous cement or calcium sulfoaluminate cement is present in aqueous-phase, preferably in form of a slurry or paste.

Component B of the two-component mortar system of the fastening system of the present invention comprises an initiator, at least one retarder, at least one mineral filler and water. To ensure a sufficient processing time, whereby the initial-set time is at least 5 min or more, at least one retarder, which prevents premature hardening of the mortar composition, is used in a distinct concentration in addition to the initiator component.

The initiator present in component B of the two-component mortar system of the fastening system is comprised of an activator component and an accelerator component which comprise a mixture of alkali and/or alkaline earth metal salts.

In particular, the activator component is constituted of at least one alkali and/or alkaline earth metal salt selected from the group consisting of hydroxides, chlorides, sulfates, phosphates, monohydrogen phosphates, dihydrogen phosphates, nitrates, carbonates and mixtures thereof, preferably the activator component is an alkali or alkaline earth metal salt, more preferably is a calcium metal salt, such as calcium hydroxide, calcium sulfate, calcium carbonate or calcium phosphate, a sodium metal salt, such as sodium hydroxide, sodium sulfate, sodium carbonate or sodium phosphate, or a lithium metal salt, such as lithium hydroxide, lithium sulfate, lithium carbonate or lithium phosphate, most preferably is lithium hydroxide. In one preferred embodiment the lithium hydroxide used in component B of the two-component mortar system of the fastening system is a 10% aqueous solution of lithium hydroxide.

Component B of the two-component mortar system of the fastening system comprises at least about 0.01 wt.-%, preferably at least about 0.02 wt.-%, more preferably at least about 0.05 wt.-%, most preferably at least about 1 wt.-%, from about 0.01 wt.-% to about 40 wt.-%, preferably from about 0.02 wt.-% to about 35 wt.-%, more preferably from about 0.05 wt.-% to about 30 wt.-%, most preferably from about 1 wt.-% to about 25 wt.-% of said activator, based on the total weight of component B. In a particular preferred embodiment, the activator is comprised of water and lithium hydroxide. The water content comprised in component B of the two-component mortar system of the fastening system is at least about 1 wt.-%, preferably at least about 5 wt.-%, more preferably at least about 10 wt.-%, most preferably at least about 20 wt.-%, from about 1 wt.-% to about 60 wt.-%, preferably from about 5 wt.-% to about 50 wt.-%, more preferably from about 10 wt.-% to about 40 wt.-%, most preferably from about 15 wt.-% to about 30 wt.-%, based on the total weight of component B. The lithium hydroxide content comprised in component B of the two-component mortar system of the fastening system is at least about 0.1 wt.-%, preferably at least about 0.5 wt.-%, more preferably at least about 1.0 wt.-%, most preferably at least about 1.5 wt.-%, from about 0.1 wt.-% to about 5 wt.-%, preferably from about 0.5 wt.-% to about 4 wt.-%, more preferably from about 1.0 wt.-% to about 3 wt.-%, most preferably from about 1.5 wt.-% to about 2.5 wt.-%, based on the total weight of component B. In a most preferred embodiment, component B of the two-component mortar system of the fastening system comprises from about 2.0 wt.-% to about 20 wt.-% of a 10% aqueous solution of lithium hydroxide, based on the total weight of component B.

The accelerator component is constituted of at least one alkali and/or earth alkaline metal salt selected from the group consisting of hydroxides, chlorides, sulfates, phosphates, monohydrogen phosphates, dihydrogen phosphates, nitrates, carbonates and mixtures thereof, preferably the accelerator component is an alkali or earth alkaline metal salt, still preferably is a water-soluble alkali or earth alkaline metal salt, more preferably is a calcium metal salt, such as calcium hydroxide, calcium sulfate, calcium carbonate, calcium chloride, calcium formate or calcium phosphate, a sodium metal salt, such as sodium hydroxide, sodium sulfate, sodium carbonate, sodium chloride, sodium formate or sodium phosphate, or a lithium metal salt, such as lithium hydroxide, lithium sulfate, lithium sulfate monohydrate, lithium carbonate, lithium chloride, lithium formate or lithium phosphate, most preferably is lithium sulfate or lithium sulfate monohydrate. Component B of the two-component mortar system of the fastening system comprises at least about 0.01 wt.-%, preferably at least about 0.05 wt.-%, more preferably at least about 0.1 wt.-%, most preferably at least about 1.0 wt.-%, from about 0.01 wt.-% to about 25 wt.-%, preferably from about 0.05 wt.-% to about 20 wt.-%, more preferably from about 0.1 wt.-% to about 15 wt.-%, most preferably from about 1.0 wt.-% to about 10 wt.-% of said accelerator, based on the total weight of component B.

In a particular preferred embodiment of component B of the two-component mortar system of the fastening system of the present invention, the ratio of 10% aqueous solution of lithium hydroxide/lithium sulfate or lithium sulfate monohydrate is 7/1 or 6/1.

The at least one retarder comprised in component B of the two-component mortar system of the fastening system according to the present invention is selected from the group consisting of citric acid, tartaric acid, lactic acid, salicylic acid, gluconic acid and mixtures thereof, preferably is a mixture of citric acid and tartaric acid. Component B of the two-component mortar system of the fastening system comprises at least about 0.1 wt.-%, preferably at least about 0.2 wt.-%, more preferably at least about 0.5 wt.-%, most preferably at least about 1.0 wt.-%, from about 0.1 wt.-% to about 25 wt.-%, preferably from about 0.2 wt.-% to about 15 wt.-%, more preferably from about 0.5 wt.-% to about 15 wt.-%, most preferably from about 1.0 wt.-% to about 10 wt.-% of said retarder, based on the total weight of component B.

In a particular preferred embodiment of component B of the two-component mortar system of the fastening system of the present invention, the ratio of citric acid/tartaric acid is 1.6/1.

The at least one mineral filler comprised in component B of the two-component mortar system of the fastening system according to the present invention is selected from the group consisting of limestone fillers, sand, crushed stones, gravels, pebbles and mixtures thereof, preferred are limestone fillers, such as various calcium carbonates. The at least one mineral filler is preferably selected from the group consisting of limestone fillers or quartz fillers, such as quartz powder Millisil W12 or W6 (Quarzwerke GmbH, Germany) and quartz sand. The at least one mineral filler of component B of the two-component mortar system of the fastening system is most preferably a calcium carbonate or a mixture of calcium carbonates. Component B of the two-component mortar system of the fastening system comprises at least about 30 wt.-%, preferably at least about 40 wt.-%, more preferably at least about 50 wt.-%, still more preferably at least about 60 wt.-%, most preferably at least about 70 wt.-%, from about 30 wt.-% to about 95 wt.-%, preferably from about 35 wt.-% to about 90 wt.-%, more preferably from about 40 wt.-% to about 85 wt.-%, still more preferably from about 45 wt.-% to about 80 wt.-%, most preferably from about 50 wt.-% to about 75 wt.-% of at least one mineral filler, based on the total weight of component B. The at least one mineral filler is chosen to obtain a particle size complementary to that of the aluminous cement.

It is preferred that the at least one mineral filler has an average particle size of not more than 500 µm, more preferably of not more than 400 µm, most preferably not more than 350 µm.

In a particular preferred embodiment of the present invention, the at least one mineral filler comprised in component B is mixture of three different calcium carbonates, i.e. calcium carbonate fines, such as different Omyacarb® types (Omya International AG, Germany). Most preferably, the first calcium carbonate has an average particle size (d50%) of about 3.2 µm and a residue of 0.05% on a 45 µm sieve (determined according to ISO 787/7). The second calcium carbonate has an average particle size (d50%) of about 7.3 µm and a residue of 0.5% on a 140 µm sieve (determined according to ISO 787/7). The third calcium carbonate has an average particle size (d50%) of about 83 µm and a residue of 1.0% on a 315 µm sieve (determined according to ISO 787/7). In a particular preferred embodiment of component B of the present invention, the ratio of first calcium carbonate/second calcium carbonate/third calcium carbonate is 1/1.5/2 1/1.5/2 or 1/1.4/2.2.

In a particular preferred alternative embodiment of the present invention, the at least one mineral filler comprised in component B is mixture of three different quartz fillers. Most preferably, the first quartz filler is a quartz sand having an average particle size (d50%) of about 240 µm. The second quartz filler is a quartz powder having an average grain size (d50%) of about 40 µm. The third quartz filler is a quartz powder having an average grain size (d50%) of about 15 µm. In a particular preferred embodiment of component B of the present invention, the ratio of first quartz filler/second quartz filler/third quartz filler is 3/2/1.

In an advantageous embodiment, component B of the two-component mortar system of the fastening system further comprises the following characteristics, taken alone or in combination.

Component B may additionally comprise a thickening agent. The thickening agent to be used in the present invention may be selected from the group consisting of bentonite, silicon dioxide, quartz, thickening agents based on acrylate, such as alkali-soluble or alkali-swellable emulsions, fumed silica, clay and titanate chelating agents. Exemplarily mentioned are polyvinyl alcohol (PVA), hydrophobically modified alkali soluble emulsions (HASE), hydrophobically modified ethylene oxide urethane polymers known in the art as HEUR, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose, attapulgite clay, and mixtures thereof. Suitable thickening agents are commercially available products, such as Optigel WX (BYK-Chemie GmbH, Germany), Rheolate 1 (Elementis GmbH, Germany) and Acrysol ASE-60 (The Dow Chemical Company). Component B comprises at least about 0.01 wt.-%, preferably at least about 0.05 wt.-%, more preferably at least about 0.1 wt.-%, most preferably at least about 0.3 wt.-%, from about 0.01 wt.-% to about 15 wt.-%, preferably from about 0.05 wt.-% to about 10 wt.-%, more preferably from about 0.1 wt.-% to about 5 wt.-%, most preferably from about 0.3 wt.-% to about 1 wt.-% of said thickening agent, based on the total weight of component B.

The presence of a retarder and thickening agent does not change the overall inorganic nature of the cementitious component B of the two-component mortar system of the fastening system.

Component B of the two-component mortar system of the fastening system comprising the initiator and retarder is present in aqueous-phase, preferably in form of a slurry or paste.

It is preferred that the pH-value of component B of the two-component mortar system of the fastening system is above 10, more preferably above 11 and most preferably is above 12, in particular in the range between 10 and 14, preferably between 11 and 13.

It is particular preferred that the proportions of water in the two components, namely component A and component B of the two-component mortar system of the fastening system, are chosen so that the water to aluminous cement ratio (W/CAC) or water to calcium sulfoaluminate cement (W/CAS), in the product obtained by mixing components A and B is lower than 1.5, preferably between 0.3 and 1.2, most preferably between 0.4 and 1.0.

Moreover, it is particular preferred that the proportion of lithium in component B of the two-component mortar system of the fastening system is chosen so that the lithium to aluminous cement ratio (Li/CAC) and lithium to calcium sulfoaluminate cement (Li/CAS), in the product obtained by mixing components A and B is lower than 0.05, preferably between 0.001 and 0.05, most preferably between 0.005 and 0.01.

Moreover, it is particular preferred that the proportion of retarder in component B of the two-component mortar system of the fastening system is chosen so that the citric acid/tartaric acid to aluminous cement ratio and citric acid/tartaric acid to calcium sulfoaluminate cement, in the product obtained by mixing components A and B is lower than 0.5, preferably between 0.01 and 0.4, most preferably between 0.1 and 0.2.

In a most preferred embodiment, component A of the two-component mortar system of the fastening system comprises or consists of the following components:
- 70 to 80 wt.-% of aluminous cement, alternatively 40 to 60 wt.-% aluminous cement and
- 15 to 25 wt.-% calcium sulfate,
- 0.5 to 1.5 wt.-% of phosphoric acid,
- 0.5 to 1.5 wt.-% of plasticizer,
- 0.001 to 0.05 wt.-% of an antimicrobial or biocidal agent,
- optionally 5 to 20 wt.-% of mineral fillers, and
- 15 to 25 wt.-% of water.

In a preferred embodiment, component B comprises or consists of the following components:
- 0.1 wt.-% to 4 wt.-% of lithium hydroxide,
- 0.1 wt.-% to 5 wt.-% of lithium sulfate or lithium sulfate monohydrate,
- 0.05 wt.-% to 5 wt.-% of citric acid,
- 0.05 wt.-% to 4 wt.-% of tartaric acid,
- 35 wt.-% to 45 wt.-% of a first mineral filler,
- 15 wt.-% to 25 wt.-% of a second mineral filler,
- 10 wt.-% to 20 wt.-% of a third mineral filler,
- 0.01 wt.-% to 0.5 wt.-% of a thickening agent, and
- 15 wt.-% to 25 wt.-% of water.

In a most preferred embodiment, component B of the two-component mortar system of the fastening system comprises or consists of the following components:
- 1.5 wt.-% to 2.5 wt.-% of lithium hydroxide,
- 1 wt.-% to 4 wt.-% of lithium sulfate or lithium sulfate monohydrate,
- 1 wt.-% to 3 wt.-% of citric acid,
- 0.5 wt.-% to 2 wt.-% of tartaric acid,
- 35 wt.-% to 45 wt.-% of a first mineral filler,
- 15 wt.-% to 25 wt.-% of a second mineral filler,
- 10 wt.-% to 20 wt.-% of a third mineral filler,
- 0.01 wt.-% to 0.5 wt.-% of a thickening agent, and
- 15 wt.-% to 25 wt.-% of water.

In a most preferred alternative embodiment, component B of the two-component mortar system of the fastening system comprises or consists of the following components:
- 3 wt.-% to 4 wt.-% of lithium hydroxide,
- 1 wt.-% to 10 wt.-% of lithium sulfate or lithium sulfate monohydrate,
- 1 wt.-% to 5 wt.-% of citric acid,
- 1 wt.-% to 3 wt.-% of tartaric acid,
- 25 wt.-% to 35 wt.-% of a first mineral filler,
- 15 wt.-% to 25 wt.-% of a second mineral filler,
- 10 wt.-% to 20 wt.-% of a third mineral filler,
- 0.01 wt.-% to 0.5 wt.-% of a thickening agent, and
- 30 wt.-% to 40 wt.-% of water.

In another most preferred embodiment, component B comprises or consists of the following components:
- 0.2 wt.-% to 1.5 wt.-% of lithium hydroxide,
- 0.1 wt.-% to 1.0 wt.-% of lithium sulfate or lithium sulfate monohydrate,
- 0.1 wt.-% to 1.0 wt.-% of citric acid,
- 0.1 wt.-% to 0.5 wt.-% of tartaric acid,
- 35 wt.-% to 45 wt.-% of a first mineral filler,
- 15 wt.-% to 25 wt.-% of a second mineral filler,
- 10 wt.-% to 20 wt.-% of a third mineral filler,
- 0.01 wt.-% to 0.5 wt.-% of a thickening agent, and
- 15 wt.-% to 25 wt.-% of water.

Component A of the two-component mortar system of the fastening system of the present invention may be prepared as follows: The phosphor-containing blocking agent is mixed with water, so that the pH-value of the resulting mixture is about 2. Plasticizer is added and the mixture homogenized. Aluminous cement, optionally calcium sulfate, and optionally mineral filler are premixed and added stepwise to the mixture whilst increasing the stirring speed, so that the pH-value of the resulting mixture is about 4. Finally, thickening agent and antibacterial/biocidal agent are added and mixed until complete homogenization of the mixture.

Component B of the two-component mortar system of the fastening system of the present invention may be prepared as follows: The accelerator is dissolved in an aqueous solution of an activator, followed by subsequent addition of retarder and homogenization of the mixture. The filler(s) is/are added stepwise whilst increasing the stirring speed until the mixture homogenizes. Finally, the thickening agent is added until complete homogenization of the mixture.

Component A and B of the two-component mortar system of the fastening system are present in aqueous phase, preferably in form of a slurry or paste. In particular, components A and B of the two-component mortar system of the fastening system have a pasty to fluid aspect according to their respective compositions. In one preferred embodiment, component A and component B of the two-component mortar system of the fastening system are in paste form thereby preventing sagging at the time of mixing the two components.

The weight ratio between component A and component B (A/B) of the two-component mortar system of the fastening system is preferentially comprised between 7/1 and 1/3, preferably is 3/1. Preferably the composition of the mixture comprises 75 wt.-% of component A and 25 wt.-% of component B. In an alternative embodiment, the composition of the mixture comprises 25 wt.-% of component A and 75 wt.-% of component B.

The two-component mortar system of the fastening system is of mineral nature, which is not affected by the presences of additional thickening agents of other agents.

The shelf life of the two-component mortar system depends on the individual shelf life of each of the respective components, in particular component A as well as component B has a shelf life of at least six months at ambient temperature so as to protect the system from the storing and supply delays. Most preferably, component A and B are individually stable for at least six months. The component A and B were stored in tightly closed containers to avoid evaporation of water at 40° C. and checked for any changes in fluidity, homogeneity, whether sedimentation occurs, and pH-value after several time intervals. The properties of all components remained unaffected after 6 months, thus the shelf life is at least 6 months at 40° C.

It is preferred that the two-component mortar system of the fastening system according to the present invention has an initial set-time of at least 5 min, preferably of at least 10 min, more preferably of at least 15 min, most preferably of at least 20 min, in particular in the range of from about 5 to 25 min, preferably in the range of about 10 to 20 min, after mixing of the two components A and B.

In the multi-component mortar system of the fastening system, especially two-component mortar system, the volume ratio of cementitious component A to initiator component B is 1:1 to 7:1, preferably is 3:1. In an alternative embodiment, the volume ratio of cementitious component A to initiator component B is 1:3 to 1:2.

After being produced separately, component A and component B of the mortar system of the fastening system are introduced into separate containers, from which they are ejected by means of mechanical devices and are guided through a mixing device. The two-component mortar system of the fastening system of the present invention is preferably a ready-for-use system, whereby component A and B are separately arranged from each other in a multi-chamber device, such as a multi-chamber cartridge and/or a multi-chamber cylinder or in two-component capsules, preferably in a two-chamber cartridge or in two-component capsules. The multi-chamber system preferably includes two or more foil bags for separating curable component A and initiator component B. The contents of the chambers or bags which are mixed together by a mixing device, preferably via a static mixer, can be injected into a borehole. The assembly in multiple chamber cartridges or pails or sets of buckets is also possible.

Without being bound by theory, the blocking agent present in component A of the two-component mortar system of the fastening system inhibits the solubilization of the calcium aluminate(s) in water, thereby stopping cement hydration which leads to the curing of the mixture. Upon adding the initiator component B, the pH-value is changed and the cementitious component A is unblocked and hydration reaction of the calcium aluminate(s) is released. As this hydration reaction is catalyzed and accelerated by the presence of alkali metals salts, in particular lithium salts, it has an initial set-time of shorter than 5 min. In order to retard the fast curing time (initial-set time), it is preferred that the at least one retarder comprised in component B of the two-component mortar system of the fastening system according to the present invention is so chosen to obtain an initial set-time of at least 5 min, preferably of at least 10 min, more preferably of at least 15 min, most preferably of at least 20 min, in particular in the range of from about 5 to 25 min, preferably in the range of about 10 to 20 min, after mixing of the two components A and B.

The role of mineral fillers, in particular in component B of the two-component mortar system of the fastening system, is to adjust the final performance with regard to mechanical strength and performance as well as long term durability. By optimizing the fillers, it is possible to optimize the water/aluminous cement ratio which allows for an efficient and fast hydration of the aluminous cement.

The fastening system for chemically fastening of anchoring means according to the present invention comprising said chemical anchor, further comprises an anchor rod. This anchor rod comprises an attachment region and an anchoring region which is insertable into a borehole and which has a profiled section including a plurality of expansion sections disposed axially in a row which are conically shaped. Preferably, the diameter of the expansion sections increases in the direction of the free front end of the anchor rod. Moreover, it is preferred that the distance of the expansion section for each of the plurality of the expansion sections is substantially constant over a longitudinal extension of the anchoring region.

Necessary for use in uncleaned and/or cracked boreholes is not a bonded connection but a form-fitting connection between the composite expansion anchor and the mortar compound. For the composite expansion anchor to be able to facilitate high load ratings and a subsequent expansion in uncleaned and/or cracked boreholes, it is necessary for the mortar shell, which encases the expansion segments, to break open. This is only possible if the mortar shell does not adhere to the expansion segments of the anchor rod with a bonded or frictional connection.

Therefore, it is of advantage for the anchoring region to have a non-adhesive surface with respect to the curable mortar compound. For this purpose, the anchoring region of the anchor rod of the fastening system according to the present invention is preferably provided with a casing or a coating, which is non-adhesive with respect to the mortar compound. As a result, the anchor rod is able to detach from the cured mortar shell with a tensile load in an opening crack and execute a movement in the axial direction. During displacement, the conically shaped expansion sections slide into the region between the mortar shell and the anchoring region that is expanded from the crack in the direction of the tensile force so that a form-fitting tension again develops between the anchor rod and the mortar shell. By further increasing the tensile load, radial forces build up with the aid of the surfaces of the conically shaped expansion sections and the cured mortar shell is broken. This leads to the anchor rod being able to expand with respect to the borehole wall, and the form fit between the borehole wall and the mortar shells is reestablished. Therefore, despite a dust layer between the mortar shell and the borehole wall, the anchor rod is able to initiate forces in the component. Because of this ability to subsequently expand, the anchor rod is suitable for use in cracks and in the tensile zone of the concrete. Due to the subsequent expansion behavior, the anchor rod of the fastening system according to the invention can also be used in boreholes that are poorly cleaned or not cleaned at all.

Therefore, in a preferred embodiment of the anchor rod of the fastening system according to the present invention, a surface of each of the plurality of expansion sections includes a coating.

The surface of the coarse screw thread can be bright-nickel-plated and/or chromium-plated or be coated with other release agents and/or lubricants, such as a wax-like, synthetic polymer, polytetrafluoroethylene, silicone polymer and the like, for instance. Alternatively, it is also possible to electrochemically polish the surface, for example by means of electro-polishing.

In a particular preferred embodiment of the anchor rod of the fastening system according to the present invention, the surface of each of the plurality of expansion sections is bright-nickel-plated and/or chromium-plated. In another particular preferred embodiment of the anchor rod of the fastening system according to the present invention, the surface of each of the plurality of expansion sections is electrochemically polished or electro-polished.

To ensure the flow of mortar from the base of the borehole to the opening of the borehole and to avoid air inclusions when placing the anchor rod, the conically shaped expansion sections should be provided, especially in the case of a small annular gap, with means for the passage of the inorganic mortar compound, i.e. chemical anchor, such as flow channels, for instance. The flow channels of the conically shaped expansion sections are preferably disposed offset from one another, wherein especially preferably the flow channels are disposed helically around the anchoring region of the anchor rod. This ensures the most uniform and complete wetting possible of the surfaces of the conically shaped expansion sections. Any air that is possibly enclosed between the conically shaped expansion sections when the anchor rod is being positioned is pressed upward through the flow channels to the borehole opening. The flow channels must be dimensioned such that the inorganic mortar compound is able to flow through them without great resistance. This also reduces the resistance when inserting the anchor rod. As a result, the most complete wetting possible of the anchoring region with the curable mortar compound is achieved.

Therefore, each of the plurality of expansion sections of the anchor rod of the fastening system according to the present invention includes a passage for the inorganic mortar compound, i.e. chemical anchor. In particular, it is preferred that the passage is a flow channel.

Further, it is preferred that each of the plurality of expansion sections of the anchor rod of the fastening system according to the present invention runs helically or vertically along the anchoring region. In a particular preferred embodiment of the anchor rod of the fastening system according to the invention, the conically shaped expansion sections are connected to each other and run helically along the anchoring region so that a thread-like profiled section that corresponds to a coarse screw thread is obtained. Because of this, it is not necessary for the profiled section to be provided with means for the passage of the inorganic mortar compound. Therefore, the conical surface is completely available for introducing the load into the component, which produces higher load ratings.

The anchor rod of the fastening system of the present invention is characterized by an optimized design of the anchoring region, which no longer requires the borehole to be cleaned in a time-consuming manner and which makes a fastening closer to the edge possible as compared to other expansion anchors or composite expansion anchors, without having to accept the load rating losses. Furthermore, the anchor rod can be used both in uncracked and cracked concrete and provides high load ratings.

The fastening system for chemically fastening of anchoring means comprising a chemical anchor being a ready-for-use two-component mortar system based on aluminous cement, and an anchor rod comprising an attachment region and an anchoring region is applied as follows.

Before the anchor rod is inserted, the borehole is filled with the two-component mortar system, thereby producing a form-fitting connection of the anchoring region to the curable mortar compound. The borehole preferably has a diameter, which is selected greater than the maximum diameter of the anchoring region such that it is surrounded on all sides by the curable mortar compound. Preferably, the maximum outer diameter of the conically shaped expansion sections is selected to be approximately 0.2 mm smaller than the borehole diameter. Further, the stress cross section of the conically shaped expansion section corresponds approximately to the stress cross section of the anchor rod.

To create a fastening arrangement with the fastening system according to the present invention, a borehole with the required depth and the required diameter is first made.

Subsequently, the borehole is filled with an appropriate amount of the curable inorganic mortar compound and then the anchor rod is introduced into the borehole, with the anchoring region forward. In particular, the helical embodiment of the conically shaped expansion sections is responsible for ensuring an optimum flow of the mortar compound in the direction of the mouth of the borehole. After the mortar compound has cured, the anchor rod can be stressed up to the maximum load level. Hence, the placement process of the anchor rod is accomplished in a known manner.

The stress cross section of the conically shaped expansion sections preferably corresponds to at least the stress cross section of the other anchoring elements, such as the cylindrical shaft or connecting thread on the attachment region so that premature steel failure of the anchor rod can be prevented. Because of the advantageous subsequent expansion behavior of the anchor rod under stress, the anchor rod of the fastening system according to the invention can be disposed in a tensile zone of a component or in a cracked borehole.

Furthermore, time-consuming cleaning of the borehole prior to placement of the anchor rod is no longer required. Due to the optimized geometry of the anchoring region, more precisely the profiled section of the anchoring region, high load ratings of the integrated anchor rod are also achieved in the region of a component close to the edge.

Eliminating the required cleaning steps (e.g., blowing out, brushing out and blowing out the borehole again) increases application safety, and placement of the anchor rod is considerably accelerated. No additional cleaning equipment is needed to place the anchor rod, and the ambient air and therefore the user are no longer additionally subjected to blown-out bore dust or dust from cleaning.

In particular, the fastening system for chemical fastening of anchoring means according to the invention is intended for use in mineral surfaces, such as structures made of brickwork, concrete, pervious concrete or natural stone, whereby the components of the two-component mortar system of the fastening system are prior mixed, for example by means of a static mixer or by destroying a cartridge or a plastic bag, or by mixing components of a multi-chamber pails or sets of buckets.

The fastening system can be used for anchoring purposes encompassing an increase in the load capacity at temperatures above room temperature or at elevated temperatures, such as above 80° C., and/or encompassing an increase in the bond stress in the cured state. An increased temperature resistance results in a better operational capability for anchoring purposes also at higher temperatures, such as temperatures being present in the area of a borehole of facade anchorages, which are exposed to strong sunlight or otherwise elevated temperatures. Due to the essentially mineral composition of the chemical anchor, the anchoring system is far less toxic and very little polluting for the environment as well as allows for a more cost-effective production than of the known system of the prior art, thereby exhibiting high load ratings as well as low expansion pressure in uncleaned and cracked boreholes and with fastenings that are close to the edge making it superior over the known prior art systems.

The following example illustrates the invention without thereby limiting it.

EXAMPLES

1. Preparation of Component A and Component B of the Chemical Anchor

The cementitious component A as well as the initiator component B of the chemical anchor is initially produced by mixing the constituents specified in Tables 1 and 2, respectively. The proportions that are given are expressed in wt.-%.

A typical mixing protocol for component A is as follows: weighting out the necessary quantity of water, introducing the water into a mixing bowl and slowly adding phosphoric acid thereto under stirring until a pH-value of about 2 is obtained; adding plasticizer and homogenizing at 100 to 200 rpm for 2 minutes; pre-mixing Ternal White® and filler in a big bucket and adding this mixture step by step whilst slowly stirring at 200 rpm to avoid lump formation, increasing stirring speed to 4000 rpm; pH-value obtained should be about 4; adding slowly thickening agent and finally antibacterial or biocidal agent and homogenizing at 5000 rpm it for 5 min.

TABLE 1

Composition of component A.

| Compound | Function | Examples A1 | A2 |
|---|---|---|---|
| Deionized water | | 19.78 | 19.98 |
| Phosphoric acid 85% | blocking agent | 0.90 | 0.91 |
| Ternal White | aluminate cement | 70.00 | 77.80 |
| $CaSO_4$ hemihydrate | ettringite former | — | — |
| Millisil W12 | filler | 8.00 | — |
| Acumer ™ 1051 | plasticizer | 1.00 | 1.01 |
| Xanthan Gum | thickening agent | 0.30 | 0.30 |
| Nuosept OB 03 | biocidal agent | 0.02 | 0.02 |

Phosphoric acid 85% marketed by Sigma-Aldrich Chemie GmbH, Germany
Ternal White ® marketed by Kerneos S.A., France
$CaSO_4$ hemihydrate, Prestia Selecta marketed by Lafarge Platres, France
Millisil W12 marketed by Quarzwerke Frechen, Germany
Acumer ™ 1051 marketed by Rohm and Haas Europe, U.K.
Xanthan Gum marketed by Colltec GmbH & CO. KG, Germany
Nuosept OB 03 marketed by Ashland Nederland B.V., The Netherlands A typical mixing protocol for component B is as follows: dissolving lithium sulfate in a 10% aqueous solution of lithium hydroxide followed by dissolving the carboxylic acids in this mixture and fully homogenizing it at 500 rpm for at least for 30 min; adding stepwise filler or filler mixture while increasing stirring speed to 2000 rpm over a time period of 5 min and continuing homogenizing it at 2000 rpm for about 10 min; finally adding thickening agent whilst stirring, and increasing stirring speed to 2500 rpm over a time period of 3 min; finally continuing homogenizing for 5 min.

TABLE 2

Composition of component B.

| Compound | Function | Examples B1 | B2 |
|---|---|---|---|
| LiOH 10% (water) | activator | 19.59 | 19.60 |
| $Li_2SO_4$ | accelerator | 2.66 | 2.66 |
| Citric acid | retarder | 1.64 | 1.64 |
| Tartaric acid | retarder | 1.02 | 1.02 |
| Filler 1 | filler | 35.78[1] | 44.93[4] |
| Filler 2 | filler | 22.53[2] | 19.47[5] |
| Filler 3 | filler | 16.54[3] | 10.48[6] |
| Optigel WX | thickening agent | 0.20 | 0.20 |

LiOH 10% (water) marketed by Bern Kraft GmbH, Germany
$Li_2SO_4$ marketed by Sigma-Aldrich Chemie GmbH, Germany
Citric acid marketed by Sigma-Aldrich Chemie GmbH, Germany
Tartaric acid marketed by Sigma-Aldrich Chemie GmbH, Germany
[1]Omyacarb 130-Al marketed by Omya International AG, Germany
[2]Omyacarb 15-H Al marketed by Omya International AG, Germany
[3]Omyacarb 2-Al marketed by Omya International AG, Germany
[4]Quarzsand F32 marketed by Quarzwerke GmbH, Germany
[5]Millisil W6 marketed by Quarzwerke GmbH, Germany
[6]Millisil W12 marketed by Quarzwerke GmbH, Germany
Optigel WX marketed by Rockwood Clay Additives GmbH, Germany 2. Determination of Mechanical Performance Depending on Fastening Element Geometry After being produced separately, the cementitious component A and initiator component B are mixed in a speed mixer in a volume ratio of 3:1 and are introduced into a prepared borehole having a diameter of 14 mm in concrete 020/25 or concrete C50/60. The borehole was created by hammer drilling and either cleaned by compressed air-cleaning or non-cleaned (Table 3).

TABLE 3

Condition of concrete tested.

| Condition | Concrete condition | Concrete | Borehole |
|---|---|---|---|
| 1 | dry concrete, dust completely removed, room temperature | C 20/25 | Cleaned |
| 2 | dry concrete, dust completely removed, room temperature | C 20/25 | Non-cleaned |
| 3 | dry concrete, dust completely removed, room temperature | C 50/60 | Non-cleaned |

Load values of the cured mortar composition are determined by introducing a cone anchor rod (inventive examples 2 to 5) and a conventional threaded anchor rod as comparison (comparative example), respectively, having an anchoring depth of 72 mm, into the cleaned or non-cleaned borehole, having a diameter of 14 mm, in differently conditioned concrete C20/25 or C50/60.

The average failure load is determined by centrally pulling out the anchor rod with tight support using high-strength steel rods using a hydraulic tool. Three anchor rods are doweled in place in each case and their load values are determined after curing for 24 hours as mean value. Ultimate failure loads are calculated as bond strengths and given in $N/mm^2$ in Table 4.

TABLE 4

Bond strengths in $N/mm^2$.

| | Comparative Example 1 using a conventional threaded anchor rod | Inventive Examples 2 to 5 using a cone anchor rod | | | |
|---|---|---|---|---|---|
| Condition | A2 + B1 | A2 + B1 | A1 + B1 | A2 + B2 | A1 + B2 |
| 1 | 13.1 | 25.2 | 24.9 | 25.2 | 25.3 |
| 2 | 4.4 | 18.5 | 18.7 | — | — |

As it can be seen from Table 4, all inventive fastening systems show considerable bond strengths after 24 hours of curing. The comparative system employing a conventional threaded anchor rod shows very little bond strengths, whereas with the cone element, the bond strength is doubled under cleaned conditions, and fourfold under non-cleaned conditions.

In addition thereto, it should be noted that a comparative system including a chemical anchor not containing any organic acid as retarder, had an initial set time of less than 5 min and could neither be introduced into any borehole nor a metal element could be anchored into it, due to an unsufficient handling time. Further, in comparison to injection mortars based on organic resins, their bond strength at elevated temperatures show significant, non-acceptable decrease in load values, at 250° C. sometimes close to zero in the organic systems, whereas the inventive examples increase in their bond strengths. Moreover, the ettringite type slurry shows particular good performance in presence of water, and in diamond drilled holes.

3. Determination of Mechanical Performance Depending on Curing Times in Non-Cleaned Boreholes Component A1 and A2, respectively, were mixed with component B1 in a ratio of 3:1 and cured with a cone anchor rod with an embedment depth of 72 mm in 14 mm non-cleaned boreholes in dry concrete C20/25 and C50/60 (conditions see Table 3), respectively, and pulled using a hydraulic tool after different time intervals at room temperature (Table 5).

TABLE 5

Bond strengths in N/mm².

| Condition | Mortar composition | 24 hours | 1 week | 2 weeks | 4 weeks |
|---|---|---|---|---|---|
| 2 | A1 + B1 | 18.7 | 23.4 | 26.6 | 28.0 |
| 3 | A1 + B1 | 17.0 | 23.5 | 27.4 | 28.3 |
| 2 | A2 + B1 | 18.5 | 23.9 | 28.0 | 28.8 |
| 3 | A2 + B1 | 19.4 | 24.9 | 29.0 | 29.6 |

As it can be seen from Table 5, there is a pronounced post-cure effect; the initial values are almost doubled after one month, thereby exhibiting a strong post-cure effect in non-cleaned boreholes.

As it has been shown above, the fastening system of the present invention provides curing rates and mechanical strength comparable to those of the organic systems, but the essentially mineral composition thereof makes it far less toxic and very little polluting for the environment as well as allows for a more cost-effective production than of the known system of the prior art. Moreover, the fastening system exhibits high load ratings as well as low expansion pressure in uncleaned and cracked boreholes and with fastenings that are close to the edge making it superior over the known prior art systems.

The invention claimed is:

1. A fastening system for chemically fastening an anchor, the fastening system comprising:
   1) a chemical anchor that is a ready-for-use two-component mortar system comprising a component A which is a curable composition, and a component B, which is in an aqueous-phase for initiating a curing process,
   wherein component A comprises water, aluminous cement, at least one plasticizer, and at least one blocking agent selected from the group consisting of phosphoric acid, metaphosphoric acid, phosphorous acid, and a phosphonic acid,
   wherein component B comprises an initiator, at least one retarder, at least one mineral filler, and water,
   wherein
   i) the initiator comprises a mixture of at least two members selected from the group consisting of an alkali metal salt, an alkaline earth metal salt, and a combination thereof,
   ii) the at least one retarder is selected from the group consisting of citric acid, tartaric acid, lactic acid, salicylic acid, gluconic acid, and a mixture thereof, and
   iii) the at least one mineral filler is selected from the group consisting of a limestone filler, sand, corundum, dolomite, alkaline-resistant glass, crushed stone, gravel, pebble, and a mixture thereof, and
   wherein said two-component mortar system has an initial set time of at least 10 minutes, and
   an anchor rod comprising an attachment region and an anchoring region,
   wherein the anchor rod is insertable into a borehole and has a profiled section comprising a plurality of expansion sections disposed axially in a row which are conically shaped.

2. The fastening system according to claim 1, wherein the initiator comprises a mixture of at least two lithium metal salts.

3. The fastening system according to claim 1, wherein the at least one retarder is citric acid, tartaric acid, or a mixture thereof.

4. The fastening system according to claim 1, wherein the at least one mineral filler has an average particle size of not more than 500 μm.

5. The fastening system according to claim 1, wherein the at least one mineral filler is a limestone filler or a mixture of at least two limestone fillers.

6. The fastening system according to claim 1, wherein component A and component B are in form of a slurry or paste.

7. A fastening system for chemically fastening an anchor comprising:
   a chemical anchor that is a ready-for-use teas-component mortar system comprising
   a curable composition component A comprising water, aluminous cement, at least one plasticizer, and at least one blocking agent selected from the group consisting of phosphoric acid, metaphosphoric acid, phosphorous acid, and a phosphoric acid, and
   an aqueous-phase for initiating a curing process component B comprising an initiator, at least one retarder, at least one mineral filler, and water, and
   an anchor rod comprising an attachment region and an anchoring region,
   wherein the anchor rod is insertable into a borehole and has a profiled section comprising a plurality of expansion sections disposed axially in a row which are conically shaped,
   wherein component B comprises
   0.1 wt.-% to 4 wt.-% of lithium hydroxide,
   0.1 wt.-% to 5 wt.-% of lithium sulfate or lithium sulfate monohydrate,
   0.05 wt.-% to 5 wt.-% of citric acid,
   0.05 wt.-% to 4 wt.-% of tartaric acid,
   35 wt.-% to 45 wt.-% of a first mineral filler,
   15 wt-% to 25 wt-% of a second mineral filler,
   10 wt.-% to 20 wt.-% of a third mineral filler,
   0.01 wt.-% to 0.5 wt.-% of a thickening agent, and
   15 wt.-% to 25 wt.-% of water.

8. The fastening system according to claim 1, wherein the distance of the expansion section for each of the plurality of the expansion sections is substantially constant over a longitudinal extension of the anchoring region.

9. The fastening system according to claim 1, wherein a surface of each of the plurality of expansion sections comprises a coating.

10. The fastening system according to claim 1, wherein a surface of each of the plurality of expansion sections is bright-nickel-plated and/or chromium-plated.

11. The fastening system according to claim 1, wherein a surface of each of the plurality of expansion sections is electrochemically polished or electro-polished.

12. The fastening system according to claim 1, wherein each of the plurality of expansion sections comprises a passage for the inorganic mortar compound.

13. The fastening system according to claim 12, wherein the passage is a flow channel.

14. The fastening system according to claim 1, wherein each of the plurality of expansion sections runs helically along the anchoring region.

15. A method of chemically fastening an anchor in a mineral surface, the method comprising:

setting the anchor in the mineral surface in the presence of the two-component mortar system according to claim 1; and curing the two-component mortar system.

16. The method according to claim 15, wherein the mineral surface is at least one member selected from the group consisting of brickwork, concrete, pervious concrete, and natural stone.

* * * * *

UNITED STATES PATENT AND TRADEMARK OFFICE
CERTIFICATE OF CORRECTION

| | | |
|---|---|---|
| PATENT NO. | : 11,214,518 B2 | Page 1 of 1 |
| APPLICATION NO. | : 15/765504 | |
| DATED | : January 4, 2022 | |
| INVENTOR(S) | : Armin Pfeil and Jens Bunzen | |

It is certified that error appears in the above-identified patent and that said Letters Patent is hereby corrected as shown below:

On the Title Page

Column 2, Item (57), Lines 3-4 of the Abstract, "albuminous" should read --aluminous--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*